US012459079B2

(12) United States Patent
Holzmeier et al.

(10) Patent No.: US 12,459,079 B2
(45) Date of Patent: Nov. 4, 2025

(54) POWER TOOL HAVING A DISK-SHAPED TOOL AND A GUARD PLATE FOR PROTECTING AGAINST FLYING SPARKS

(71) Applicant: Hilti Aktiengesellschaft, Schaan (LI)

(72) Inventors: Georg Holzmeier, Martkoffingen (DE); Roland Meuer, Ettringen (DE)

(73) Assignee: Hilti Aktiengesellschaft, Schaan (LI)

( * ) Notice: Subject to any disclaimer, the term of this patent is extended or adjusted under 35 U.S.C. 154(b) by 242 days.

(21) Appl. No.: 18/038,484

(22) PCT Filed: Nov. 11, 2021

(86) PCT No.: PCT/EP2021/081383
§ 371 (c)(1),
(2) Date: May 24, 2023

(87) PCT Pub. No.: WO2022/117308
PCT Pub. Date: Jun. 9, 2022

(65) Prior Publication Data
US 2024/0009802 A1   Jan. 11, 2024

(30) Foreign Application Priority Data

Dec. 4, 2020 (EP) .................................... 20211901

(51) Int. Cl.
*B24B 55/05* (2006.01)
*B23D 45/16* (2006.01)
*B25F 5/02* (2006.01)

(52) U.S. Cl.
CPC ............ *B24B 55/052* (2013.01); *B23D 45/16* (2013.01); *B25F 5/02* (2013.01)

(58) Field of Classification Search
CPC .......... B24B 55/052; B23D 45/16; B25F 5/02
See application file for complete search history.

(56) References Cited

U.S. PATENT DOCUMENTS

| | | |
|---|---|---|
| 3,971,906 A | 7/1976 | Sahrbacker et al. |
| 5,577,600 A | 11/1996 | Schoene et al. |
| 5,890,292 A | 4/1999 | Stark et al. |
| 6,591,826 B1 | 7/2003 | Donnerdal et al. |

(Continued)

FOREIGN PATENT DOCUMENTS

| | | |
|---|---|---|
| AU | 2008246247 A1 | 12/2008 |
| CN | 1729081 A | 2/2006 |

(Continued)

OTHER PUBLICATIONS

International Search Report of PCT/EP2021/081394 dated Jan. 24, 2022.

(Continued)

*Primary Examiner* — Omar Flores Sanchez
(74) *Attorney, Agent, or Firm* — Davidson Kappel LLC

(57) ABSTRACT

A power tool having a disk-shaped tool and a guard plate in order to protect the power tool from flying sparks. The guard plate here has devices for supporting a secure standing position of the power tool, wherein the devices include an elastic material and can be preassembled on tabs of the guard plate. An assembly and a method for rapidly mounting a guard plate and devices for supporting a secure standing position of a power tool on a power tool is also provided.

14 Claims, 8 Drawing Sheets

(56) References Cited

U.S. PATENT DOCUMENTS

| | | | |
|---|---|---|---|
| 6,812,425 | B1 | 11/2004 | Wong et al. |
| 7,144,311 | B2 * | 12/2006 | Jaensch .................. B24B 27/08 |
| | | | 451/352 |
| 7,520,276 | B2 * | 4/2009 | Jakobsson ................ B28D 1/04 |
| | | | 451/344 |
| 9,144,923 | B2 * | 9/2015 | Yokoyama ............. B28D 1/045 |
| 9,221,111 | B2 * | 12/2015 | Elfner ..................... B24B 27/08 |
| 2003/0166386 | A1 | 9/2003 | McDonald et al. |
| 2005/0205406 | A1 | 9/2005 | Wong et al. |
| 2006/0052041 | A1 | 3/2006 | Wiker |
| 2007/0240313 | A1 * | 10/2007 | Layher .................... B24B 27/08 |
| | | | 30/123.3 |
| 2010/0288907 | A1 * | 11/2010 | Schweinberger ...... B23D 45/16 |
| | | | 248/672 |
| 2011/0214657 | A1 | 9/2011 | Okumi et al. |
| 2013/0180116 | A1 | 7/2013 | Yokohama et al. |
| 2013/0247896 | A1 * | 9/2013 | Andersson ............. B23D 45/16 |
| | | | 125/13.01 |
| 2015/0151447 | A1 * | 6/2015 | Petersson ............... B23D 47/12 |
| | | | 318/722 |
| 2015/0367496 | A1 | 12/2015 | Kaupp et al. |
| 2017/0008159 | A1 | 1/2017 | Boeck et al. |
| 2017/0110266 | A1 | 4/2017 | Chiang et al. |
| 2018/0281086 | A1 | 10/2018 | Greitmann et al. |
| 2021/0053175 | A1 | 2/2021 | Otani et al. |
| 2022/0118596 | A1 | 4/2022 | Hatakeyama et al. |
| 2022/0158289 | A1 * | 5/2022 | Almqvist ................ B25F 5/008 |
| 2023/0044008 | A1 * | 2/2023 | Miyazawa ............ B24B 23/028 |
| 2023/0090978 | A1 * | 3/2023 | Arnell .................... B23D 45/16 |
| | | | 408/67 |
| 2024/0009802 | A1 * | 1/2024 | Holzmeier ............ B24B 55/052 |

FOREIGN PATENT DOCUMENTS

| | | |
|---|---|---|
| DE | 4334933 A1 | 4/1995 |
| DE | 102005002126 A1 | 7/2006 |
| DE | 102014208980 A1 | 7/2015 |
| DE | 202020002472 U1 | 7/2020 |
| EP | 3173187 A1 | 5/2017 |
| EP | 3415280 A1 | 12/2018 |
| WO | WO 03061913 A1 | 7/2003 |
| WO | WO 2007069946 A1 | 6/2007 |
| WO | WO 2019194036 A1 | 10/2019 |
| WO | WO 2020110543 A1 | 6/2020 |
| WO | WO2022117308 A1 | 6/2022 |
| WO | WO2022117309 A1 | 6/2022 |
| WO | WO2022117310 A1 | 6/2022 |
| WO | WO2022117311 A1 | 6/2022 |
| WO | WO2022117409 A1 | 6/2022 |

OTHER PUBLICATIONS

International Search Report of PCT/EP2021/0821797 dated Feb. 4, 2022.
International Search Report of PCT/EP2021/081385 dated Feb. 24, 2022.
International Search Report of PCT/EP2021/081389 dated Feb. 24, 2022.
International Search Report of PCT/EP2021/081383 dated Dec. 22, 2021.
WO2022117308 A1/PCT/EP2021/081383, Jun. 9, 2022, National phase filed as U.S. Appl. No. 18/038,484, filed May 24, 2023.
WO2022117310 A1/PCT/EP2021/081389, Jun. 9, 2022, National phase filed as U.S. Appl. No. 18/038,481, filed May 24, 2023.
WO2022117309 A1/PCT/EP2021/081385, Jun. 9, 2022, National phase filed as U.S. Appl. No. 18/038,480, filed May 24, 2023.
WO2022117311 A1/PCT/EP2021/081394, Jun. 9, 2022, National phase filed as U.S. Appl. No. 18/038,477, filed May 24, 2023.
WO2022117409 A1/PCT/EP2021/082797, Jun. 9, 2022, National phase filed as U.S. Appl. No. 18/038,474, filed May 24, 2023.

* cited by examiner

POWER TOOL HAVING A DISK-SHAPED TOOL AND A GUARD PLATE FOR PROTECTING AGAINST FLYING SPARKS

The present invention relates to a power tool having a disk-shaped tool and a guard plate in order to protect the power tool from flying sparks.

BACKGROUND

In the power tool sector, cut-off grinders by means of which, for example, cuts can be made even in hard substrates, such as steel, are known. Cut-off grinders, which are also provided for cutting steel, frequently require special protection against flying sparks that arise during cutting of steel. For this purpose, a guard plate is attached to the cut-off grinder, the guard plate being intended to prevent the sparks from damaging sensitive or flammable parts of the power tool or of the housing thereof. In addition, standing feet are also mounted in some cut-off grinders in order to ensure a good and slip-proof standing position of the devices between work.

SUMMARY OF THE INVENTION

In order to fasten these standing feet to the device, plain washers or similar are also generally necessary in addition to the screws in order to distribute the bearing forces of the screws over a larger area of the standing foot since the latter is otherwise not sufficiently secured. In addition, this larger bearing area of the fastening element is necessary in order to prevent the material of the standing foot from being damaged, for example due to cracking or the like, by means of the vibrations during operation.

An object on which the present invention is based is that of overcoming the above-described defects and disadvantages of the prior art and of providing a power tool which, owing to a large bearing area, permits a secure and stable standing position of the power tool. Moreover, the solution to be provided is intended to be robust and resistant, in particular as far as the material to be used is concerned. Furthermore, the solution to be provided is intended to be able to be mounted in a simple and uncomplicated manner on the power tool, with in particular a reduction in the number of parts, such as screws and plain washers, being desirable.

According to the invention, a power tool having a disk-shaped tool and a guard plate in order to protect the power tool from flying sparks is provided. The power tool is characterized in that the guard plate comprises devices for supporting a secure standing position of the power tool, wherein the devices comprise an elastic material and can be mounted or preassembled on tabs of the guard plate. Tests have shown that the described disadvantages of conventional standing feet can be minimized by providing preassemblable devices for supporting a secure standing position of the power tool. This is achieved in particular in that the devices can be fastened to the power tool via the guard plate. The fastening screws and also the plain washers for fastening the devices are therefore omitted. In addition, the separate mounting step of fastening the devices can advantageously be omitted.

The power tool can be in particular a cut-off grinder with which, for example, even steel can be cut. Such a cut-off grinder preferably has a disk-shaped cutting disk which, in the context of the present invention, is referred to as a tool of the cut-off grinder or of the power tool. The cutting disk and the tool are conventionally surrounded in cut-off grinders by a protective hood in order to protect the user against chips and splashing cooling liquid.

It is preferred that the "devices for supporting a secure standing position of the power tool" are also referred to in the context of the present invention as "standing feet" or "rubber feet". In particular, the elastic material of which the standing feet are composed can be rubber. For the purposes of the invention, it is preferred that the elastic material is selected from a group comprising hydrated acrylonitrile-butadiene rubber (HNBR), nitrile rubber (NBR) and/or fluororubber (FKM). These materials advantageously have high UV stability and good thermal stability. Moreover, the materials have been shown to be particularly weather-resistant, and therefore they can readily be used in the open air, for example on a building site.

The material HNBR is particularly suitable for the production of the standing feet since it has a good temperature stability of up to 150° C. This is important since, during the cutting of steel, sparks may arise which are intended to be kept away from the device by means of the guard plate. However, the sparks may cause heating of the guard plate, and therefore it is preferred in the context of the present invention to use a material which is as heat-resistant as possible for the standing feet. Moreover, HNBR is distinguished by particularly good weather resistance. Furthermore, HNBR has very good abrasion resistance. HNBR is also a cost-effective production solution for the standing feet. The guard plate of the power tool has tabs, wherein the standing feet can be preassembled on the tabs of the guard plate. A front portion of the guard plate is conventionally present on a side of the housing of the power tool that faces the tool, in order to protect sensitive or flammable parts of the power tool or of the housing thereof against sparks flying around that may arise during the cutting of steel. One possible attachment of the guard plate is illustrated in FIG. 1. For the purposes of the invention, it is in particular preferred to provide the guard plate in the spatial vicinity of a front handle of the cut-off grinder.

For the purposes of the invention, it is preferred that the front handle is in the form of a circumferential handle. The term "circumferential" is not an unclear term for a person skilled in the art since they know that front handles in the region of power tools conventionally run around the housing or the main body of the device. In other words, such front handles at least partially surround the housing or the main body of the power tool, as a result of which, firstly, stable guiding of the power tool by the user is made possible. Secondly, the machine is effectively protected by the preferably circumferential front handle against mechanical damage, for example against impacts or when dropped. For the purposes of the invention, it is preferred that a lower portion of the guard plate is arranged with the standing feet in the region of a bottom side of the front handle, wherein said bottom side preferably coincides with a bottom side of the housing or of the main body of the power tool. One possible attachment of a guard plate to the power tool is illustrated in FIG. 2. For the purposes of the invention, it is preferred that the tabs at least partially form the lower portion of the guard plate. As a result, in the mounted position of the assembly consisting of guard plate and standing feet, the standing feet, which can be pushed onto the tabs of the guard plate, are advantageously present on the bottom side of the housing or of the main body of the power tool, and therefore they can ensure a secure and stable standing position of the power tool.

The front handle is conventionally enclosed by the left hand in the case of right-handed people. In particular larger machines frequently have a second handle which, for the purposes of the invention, is referred to as a rear handle. The rear handle is conventionally enclosed by the right hand in the case of right-handed people. It can preferably be in the form of a C- or D-shaped handle. For the purposes of the invention, it is preferred that the power tool comprises both a first, front handle and a second, rear handle. The rear handle preferably comprises operating means for the power tool in order, for example, to switch the power tool on or off or to change operating parameters.

The tabs of the guard plate can be arranged laterally on the guard plate in order to facilitate the mounting of the standing feet on the power tool. The tabs are therefore preferably also referred to as lateral tabs. For the purposes of the invention, it is preferred that the standing feet can be preassembled on the guard plate, as a result of which an assembly is formed which can be fastened to the power tool in one working step. The attachment of the standing feet to the power tool can thereby be substantially facilitated. The assembly constitutes a second aspect of the present invention and may preferably also be referred to in the context of the invention as a preassembly assembly.

In order to facilitate the mounting of the standing feet on the guard plate or on the preferably lateral tabs thereof, the standing feet can comprise slots into which the tabs of the guard plate can be inserted. In other words, the devices for supporting the secure standing position of the power tool can have slots for receiving the tabs of the guard plate, wherein the standing feet can be pushed laterally onto the tabs of the guard plate. In order, after the preassembly, to ensure an optimum position of the standing feet in relation to the guard plate, it is advantageous to provide a defined end stop for the standing feet on the guard plate.

The tabs can be provided with a bead for better holding of the preassembled standing feet, and therefore a prestress can be applied to the standing foot by an undersize of the slot width. The standing feet are preferably fixed laterally by a raised and circumferential mating contour on the housing part. This can be undertaken by an elevated rib, which encircles the edge and surrounds the standing foot, on the housing of the power tool. The standing foot is thereby held securely and stably in both spatial directions on the housing of the power tool. In other words, for the purposes of the invention, it is preferred that the power tool has a raised mating contour for fastening the standing feet on the guard plate. The power tool moreover comprises a housing, wherein the mating contour for fastening the standing feet is formed by a circumferential elevated wall on the housing of the power tool.

There is therefore no free movability in relation to the device housing for the mounted standing feet, and the standing feet are especially capable of ensuring a secure and stable standing position of the power tool on a substrate.

Significant advantages of the invention consist in that the standing feet can be fixed to the housing of the power tool by a relatively large pressing surface. The large bearing area of the standing feet on a substrate is preferably also promoted by the specific spatial configuration of the standing feet. Preferred embodiments of the standing feet are illustrated in the figures. A configuration of the standing feet with a trapezoidal area is particularly preferred. Owing to the comparatively large bearing area, the risk of cracking in the material of the standing foot can be considerably reduced, and therefore the rubber standing feet provided for the power tool are particularly robust and durable. In particular, the invention makes it possible to dispense with the use of additional fastening screws and washer elements for the fastening of the standing feet. Furthermore, the mounting step for fastening the standing feet on the housing of the power tool can be omitted since this is advantageously completed by mounting the preassembly assembly consisting of guard plate and standing feet.

For the purposes of the invention, it is preferred that the guard plate has an L shape with a front portion and a lower portion. Moreover, it may be preferred that the front portion and the lower portion enclose an angle with each other which lies in a range of 70 to 110 degrees, preferably between 80 and 100 degrees and most preferably between 85 and 95 degrees. The region between the front and the lower portion of the guard plate is formed by a rounded portion of the material. In other words, a transition between the front portion and the lower portion of the guard plate can be configured as a circular arc surface, wherein the circular arc surface can be used as a rolling surface. For the purposes of the invention, it is preferred that the transition between the front portion and the lower portion of the guard plate is configured as a large circular arc surface which, for example, encloses an angle of 70 to 110 degrees, preferably 80 to 100 degrees and most preferably an angular range of 85 to 95 degrees. The angle which is enclosed by the circular arc surface preferably corresponds to the angle which is enclosed by the front portion and a lower portion of the guard plate. During work with the power tool, the circular arc surface can advantageously serve firstly as a rolling surface on the substrate during penetration of the cutting disk and secondly as a scraper edge during the actual cutting process.

For the purposes of the invention, it is preferred that the front region of the guard plate is arranged on a front side of the housing or of the main body of the power tool when the guard plate or the assembly is fastened to the power tool. For the purposes of the invention, it is moreover preferred that the lower region of the guard plate is arranged on a lower side of the housing or of the main body of the power tool when the guard plate or the assembly is fastened to the power tool. The corresponding arrangement in the state mounted on the power tool can be seen in FIGS. 1 and 2. By means of the preferably L-shaped configuration of the guard plate, a stable attachment of the guard plate or of the assembly to the power tool is made possible. Furthermore, the internal sensitive components of the power tool, which components are preferably present in the main body thereof, are optimally protected by the preferably L-shaped configuration of the guard plate from sparks flying around, as may arise during cutting of steel.

For the purposes of the invention, it is preferred that the lower portion of the guard plate has at least one bead for increasing the flexural rigidity of the guard plate. The bead advantageously serves for improving the flexural rigidity of the lower portion of the guard plate, in particular in the region of the tabs onto which the standing feet are pushed. Moreover, the at least one bead serves for increasing the prestress on the standing feet so that the standing feet do not fall down from the tabs after the preassembly.

Moreover, the front portion of the guard plate can also have at least one bead for increasing the flexural rigidity of the guard plate. For the purposes of the invention, it is particularly preferred that the front portion of the guard plate has three beads for improving the flexural rigidity of the guard plate. These three beads are illustrated in the figures.

For the purposes of the invention, it is preferred that the standing feet have a substantially trapezoidal area. Examples of possible specific shapes for the standing feet are illustrated in the figures. The use of standing feet which are preferably formed symmetrically with respect to the center axis permits the use of identical parts, as a result of which the production and the processing of the standing feet can be simplified.

For the purposes of the invention, it is particularly preferred that the power tool has two standing feet, wherein one standing foot can be pushed in each case onto one side of the tab of the guard plate. As a result, good stability of the power tool when it is set down on the standing feet can advantageously be achieved.

In a further aspect, the invention relates to an assembly for rapidly mounting a guard plate and standing feet on a power tool. The assembly comprises a guard plate and standing feet, wherein the standing feet comprise an elastic material and can be preassembled or mounted on the tabs of the guard plate. The assembly is advantageously a separate component which may also be purchased individually. The assembly can be preassembled in the sense that the standing feet are fastened to the tabs of the guard plate and this unit can then be fastened as a separate assembly to the power tool.

In a further aspect, the invention relates to a method for rapidly mounting a guard plate and standing feet on a power tool. The terms, definitions and technical advantages introduced for the power tool and the assembly preferably apply analogously to the mounting method. The mounting method is characterized by the following method steps:

a) providing a power tool,
b) providing an assembly comprising a guard plate and devices for supporting a secure standing position of the power tool, wherein the devices comprise an elastic material and are preassembled on tabs of the guard plate,
c) mounting the assembly on the power tool.

A significant advantage of the invention consists in that the mounting of the standing feet on the power tool can be considerably simplified and made more rapid by the standing feet being preassembled on the guard plate. For the purposes of the invention, it is preferred that, by means of this preassembly, the proposed assembly which comprises in particular the guard plate, and the standing feet, and which is configured to be fastened to the power tool can be obtained. For the purposes of the invention, it is particularly preferred that the preassembled assembly can be mounted on a bottom side and a front side of the main body of the power tool. A front portion of the guard plate is preferably mounted here on the front side of the power tool, wherein said front side faces the tool of the power tool, while a lower portion of the guard plate, on which the standing feet are also arranged in the preassembled state, is mounted on a bottom side of the power tool.

Further advantages will become apparent from the following description of the figures. The figures, the description and the claims contain numerous features in combination. A person skilled in the art will expediently also consider the features individually and combine them to form useful further combinations.

BRIEF DESCRIPTION OF THE DRAWINGS

In the figure, the same and similar components are numbered with the same reference signs. In the figure.

DETAILED DESCRIPTION

Figure 1:
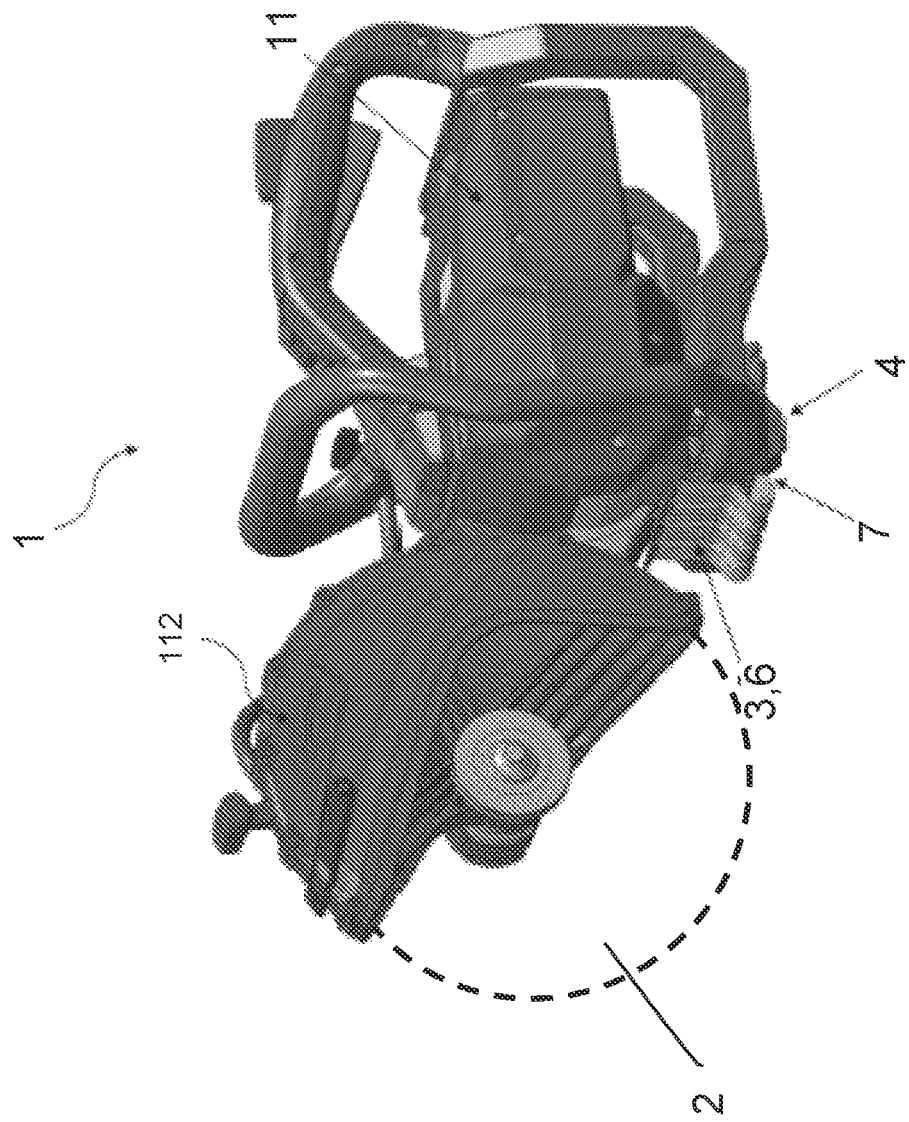
FIG. 1 shows a view of a preferred configuration of the proposed power tool

FIG. 1 shows a preferred configuration of the proposed power tool 1. The power tool 1 illustrated in FIG. 1 has a front, circumferential handle, and a rear handle. The handles enclose a main body of the power tool 1, which is surrounded by a housing 11. Furthermore, the power tool 1 has a tool 2 (shown solely schematically), wherein the protective hood of the tool 2 is representatively denoted by reference sign 112 in FIG. 1. The power tool 1 illustrated in FIG. 1 is a cut-off grinder which is preferably configured to introduce cuts into hard materials, such as concrete and steel. The tool 2 of such a cut-off grinder 1 is conventionally disk-shaped and is referred to as a cutting disk.

The front circumferential handle and the rear circumferential handle of the power tool 1 preferably define the spatial directions "front" and "rear", and also "front side" and "rear side". For the purposes of the invention, it is preferred that the main body of the power tool 1 has a front side which is arranged in the region of the front circumferential handle of the power tool 1. This front side of the main body of the power tool 1 is preferably arranged in such a manner that it faces the tool 2 of the power tool 1. In the lower region of said main body of the power tool 1 there is the preassembled assembly 10 which comprises in particular a guard plate 3 and standing feet 4 (see, e.g., FIG. 3). The preassembly of the assembly 10 consists in that the standing feet 4 are pushed onto tabs 5 of the guard plate 3 such that they are held by the guard plate 3. For this purpose, the standing feet 4 can have slots 8 (see, e.g, FIG. 4) which are configured in such a manner that they can receive the lateral tabs 5 of the guard plate 3. The preassembled assembly 10 consisting of guard plate 3 and standing feet 4 can be fastened to the power tool 1 in a particularly simple and uncomplicated manner. The standing feet 4 are produced from an elastic material, such as rubber, or comprise such an elastic material. Owing to the elasticity of the material of the standing feet 4, the power tool 1 which is provided with the assembly 10 has a secure and stable standing position and can be placed in a particularly slip-proof manner on a substrate.

The guard plate 3 has an L shape with a front portion 6 and a lower portion 7, wherein the front portion 6 and the lower portion 7 of the guard plate 3 enclose an angle which is substantially a right angle with each other. This angle may be for example 85 degrees, 90 degrees or 93 degrees. For the purposes of the invention, it is preferred that, in the mounted state, the front portion 6 of the guard plate 3 is arranged on the front side of the main body of the power tool 1, while, in the mounted state, the lower portion 7 of the guard plate 3 is arranged on a bottom side of the power tool 1.

Figure 2:
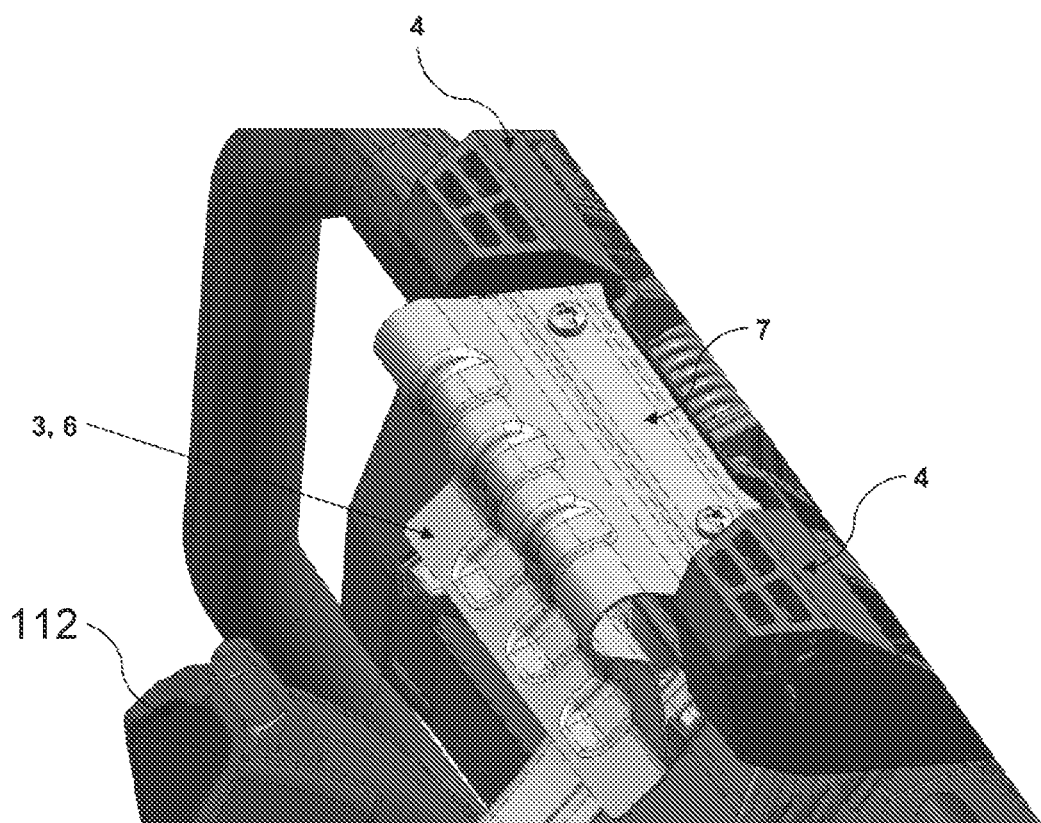
FIG. 2 shows a view of a preferred configuration of a bottom side of the proposed power tool.

FIG. 2 shows a preferred configuration of the bottom side of the proposed power tool 1. In particular the lower portion 7 of the guard plate 3 can be seen, wherein it is in particular this lower portion 7 of the guard plate 3 on which the tabs 5 are arranged for fastening the standing feet 4. This is illustrated in particular also in FIG. 3. It is moreover shown in FIG. 2 that the guard plate 3 can be fastened to the power tool 1 or to the housing 11 thereof with two fastening screws. The tool 2 of the power tool 1 or the protective hood 112 thereof can be seen in the left, lower region of FIG. 2.

Figure 3:
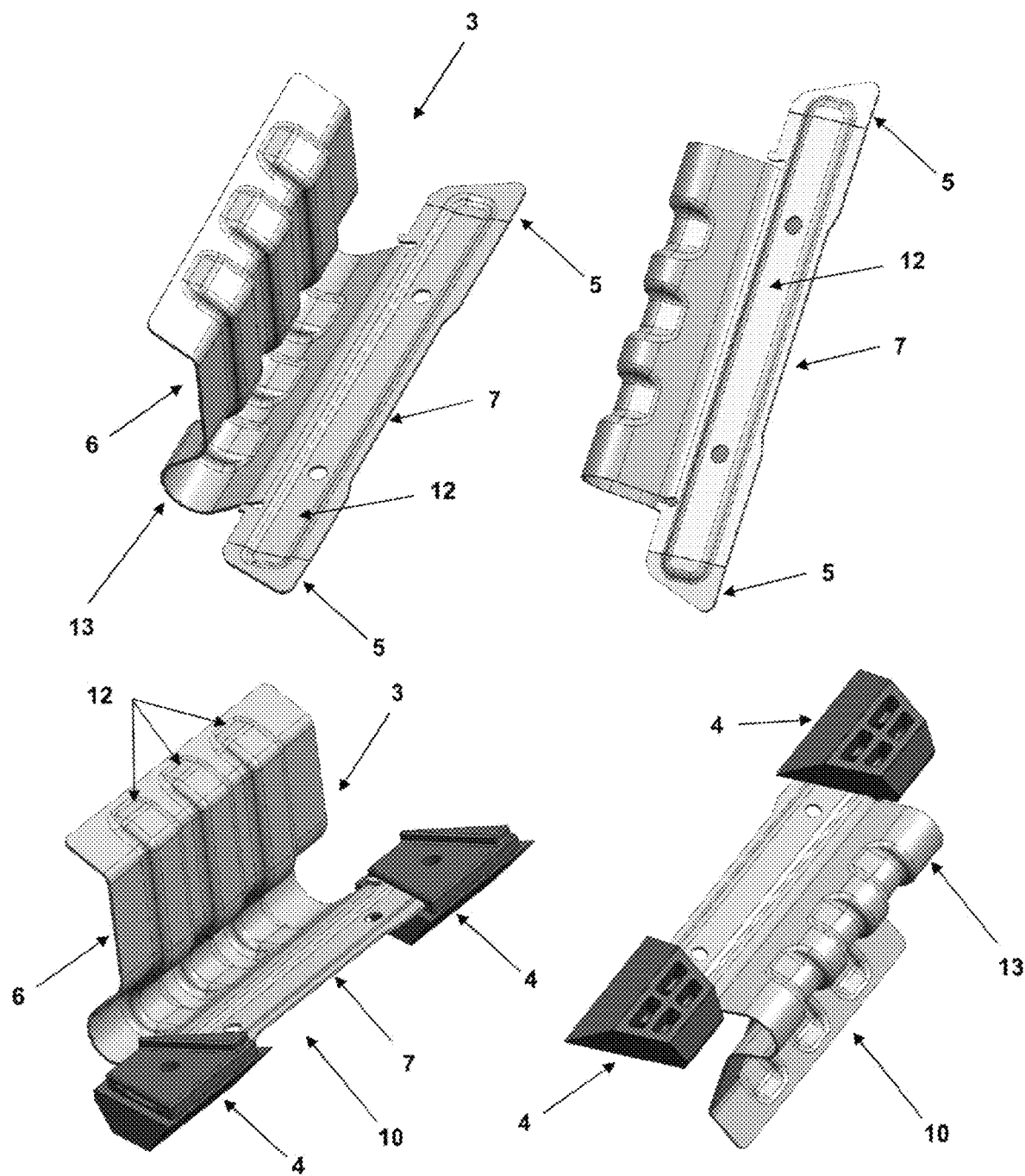
FIG. 3 shows a view of a preferred configuration of the guard plate with and without standing feet

FIG. 3 shows a preferred configuration of the guard plate 3 with standing feet 4 (at the bottom) and without standing feet 4 (at the top). The upper part of FIG. 3 shows the guide plate 3 with its components—front portion 6, lower portion 7 and the tabs 5, which are preferably located on the lower portion 7 of the guard plate 3, specifically preferably on the sides of the lower portion 7. In particular, the upper part of FIG. 3 shows the guard plate 3 with the lateral tabs 5 for fastening the standing feet 4. The lower part of FIG. 3 shows the assembly 10 fully preassembled, wherein the standing feet 4 are already fastened to the tabs 5 of the guard plate 3 here. The standing feet 4 can have slots 8 with which the standing feet 4 can be pushed over the tabs 5 of the lower portion 7 of the guard plate 3. FIG. 3 therefore shows the preassembling of the standing feet 4 by pushing the standing feet 4 onto the tabs 5 of the guard plate 3. The preassembled assembly 10 is thereby obtained. The guard plate has beads 12 for increasing the flexural rigidity of the guard plate and a circular arc surface 13 usable as a rolling surface.

Figure 4:
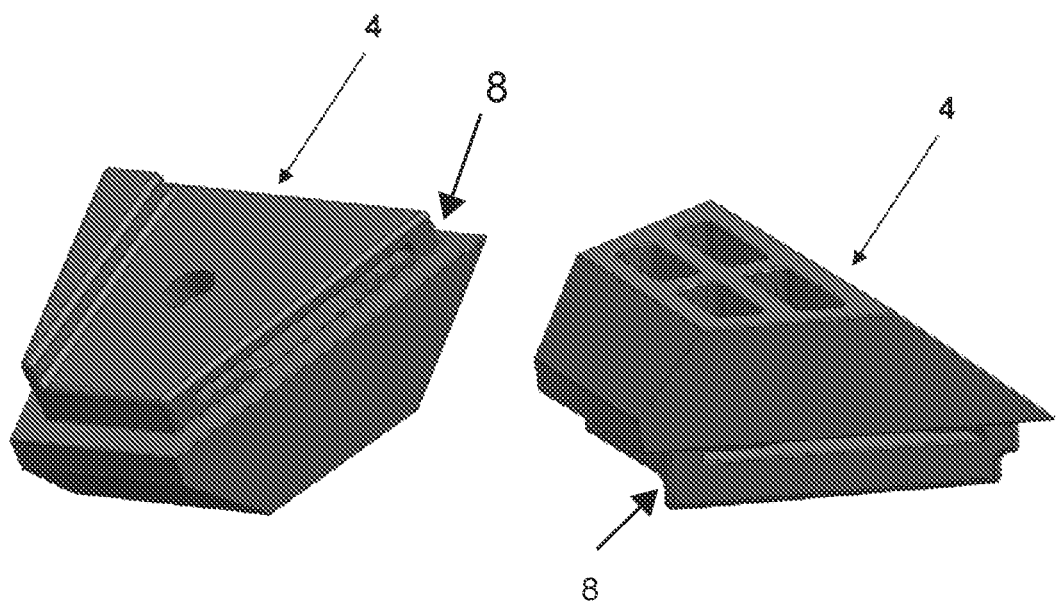
FIG. 4 shows a view of a preferred configuration of the standing feet

FIG. 4 shows a preferred configuration of the standing feet 4 with their slots 8 into which the tabs 5 of the guard plate 3 can be inserted.

Figure 5:
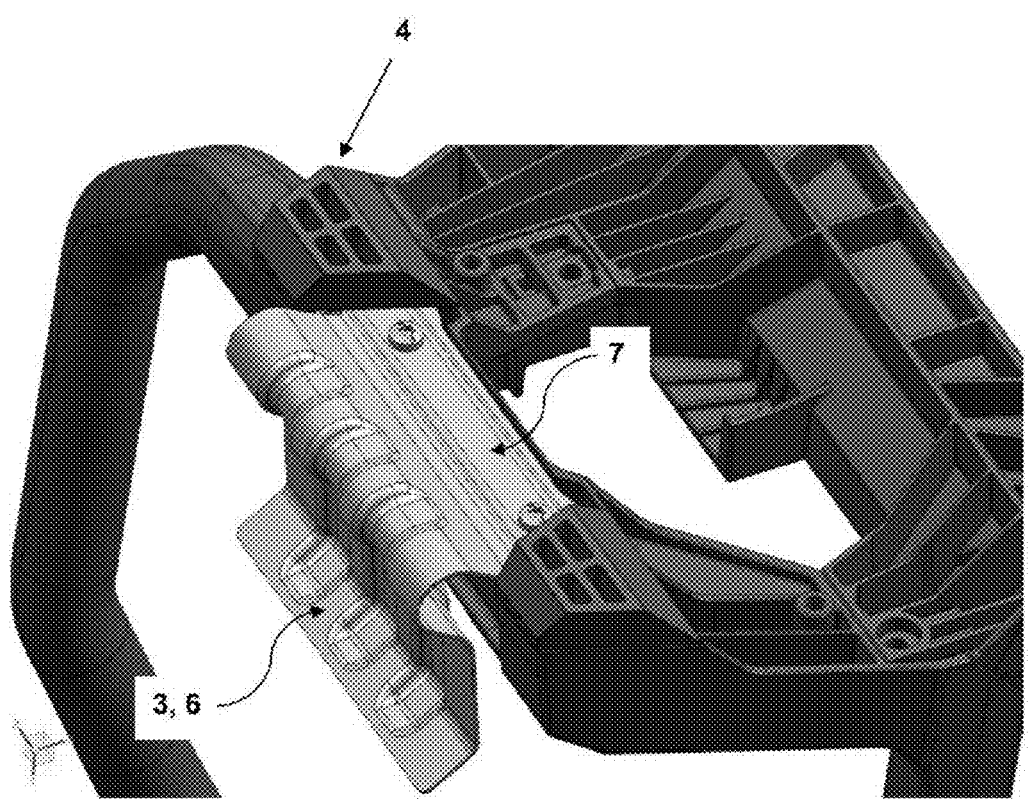
FIG. 5 shows a view of a preferred configuration of the assembly

FIG. 5 shows a preferred configuration of the assembly 10 in the mounted state on the power tool 1. The guard plate 3, or the front portion 6 and the lower portion 7 of the guard plate 3, and the standing feet 4 can be seen. In particular, FIG. 5 provides a view of a preferred configuration of the bottom side of the proposed power tool 1.

Figure 6:
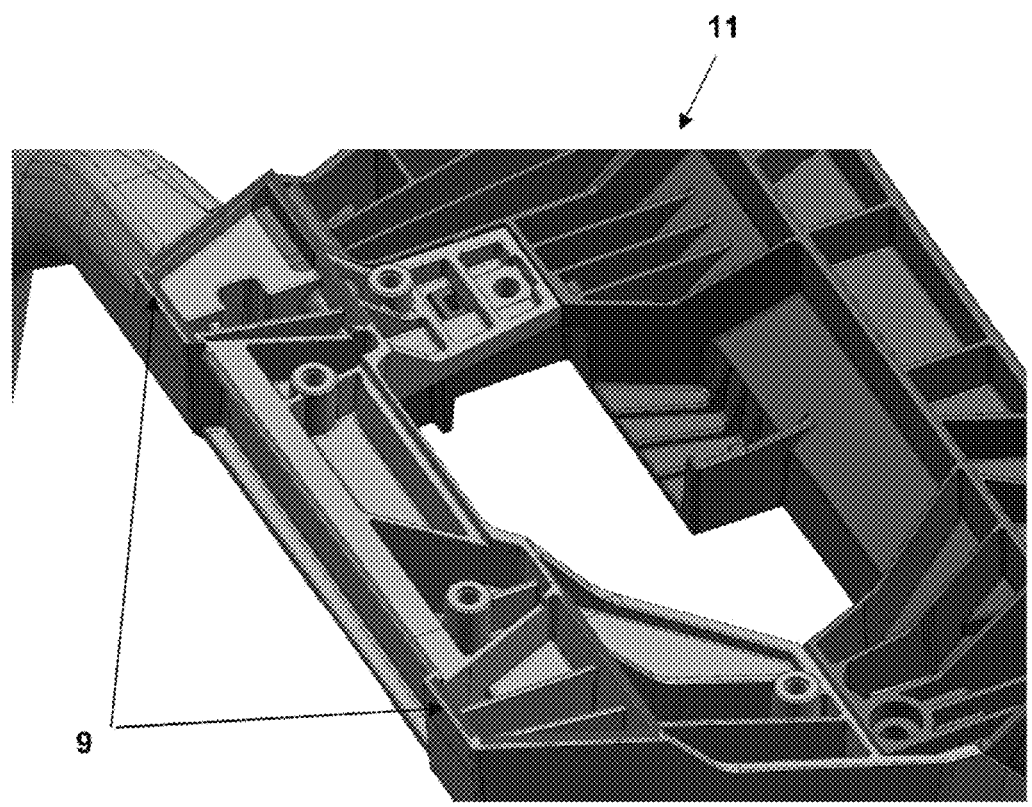
FIG. 6 shows a view of a preferred configuration of the mating contour on the housing of the power tool

FIG. 6 shows a preferred configuration of the mating contour 9 on the housing 11 of the power tool 1. The mating contour 9 is preferably present on the bottom side of the power tool 1. For the purposes of the invention, it is preferred that the mating contour 9 is raised and is configured for fastening the guard plate 3 of the power tool 1. For the purposes of the invention, it is very particularly preferred that the mating contour 9 is formed by a circumferential raised wall on the housing 11 of the power tool 1. This wall advantageously ensures that the standing foot 4 is guided laterally in the housing 11.

Figure 7:
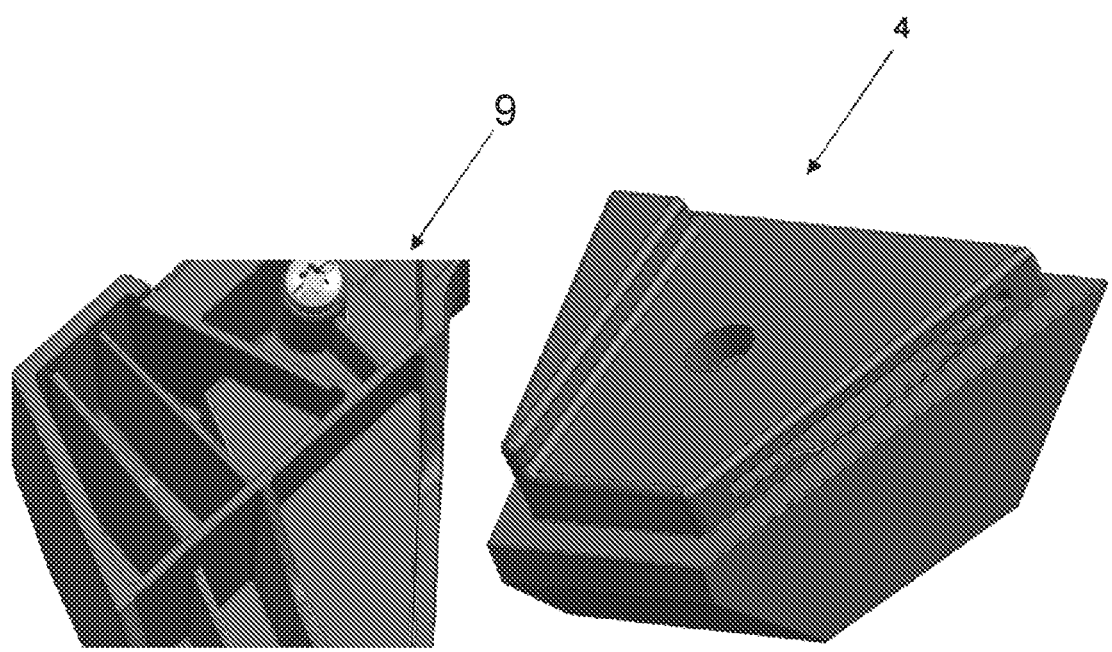
FIG. 7 shows a view of a preferred configuration of the standing feet

FIG. 7 shows a preferred configuration of the standing feet 4 with which a particularly secure and stable standing position of the power tool 1 can be achieved. Furthermore, the slip resistance of the power tool 1 can be substantially improved by the standing feet 4. A significant advantage of the invention consists in that the mounting of the standing feet 4 on the power tool 1 can be considerably simplified and made more rapid by the standing feet 4 being preassembled on the guard plate 3, wherein the preassembling of standing feet 4 and guard plate 3 makes it possible to obtain the proposed assembly 10. The left side of FIG. 7 shows more detail of the mating contour 9.

Figure 8:
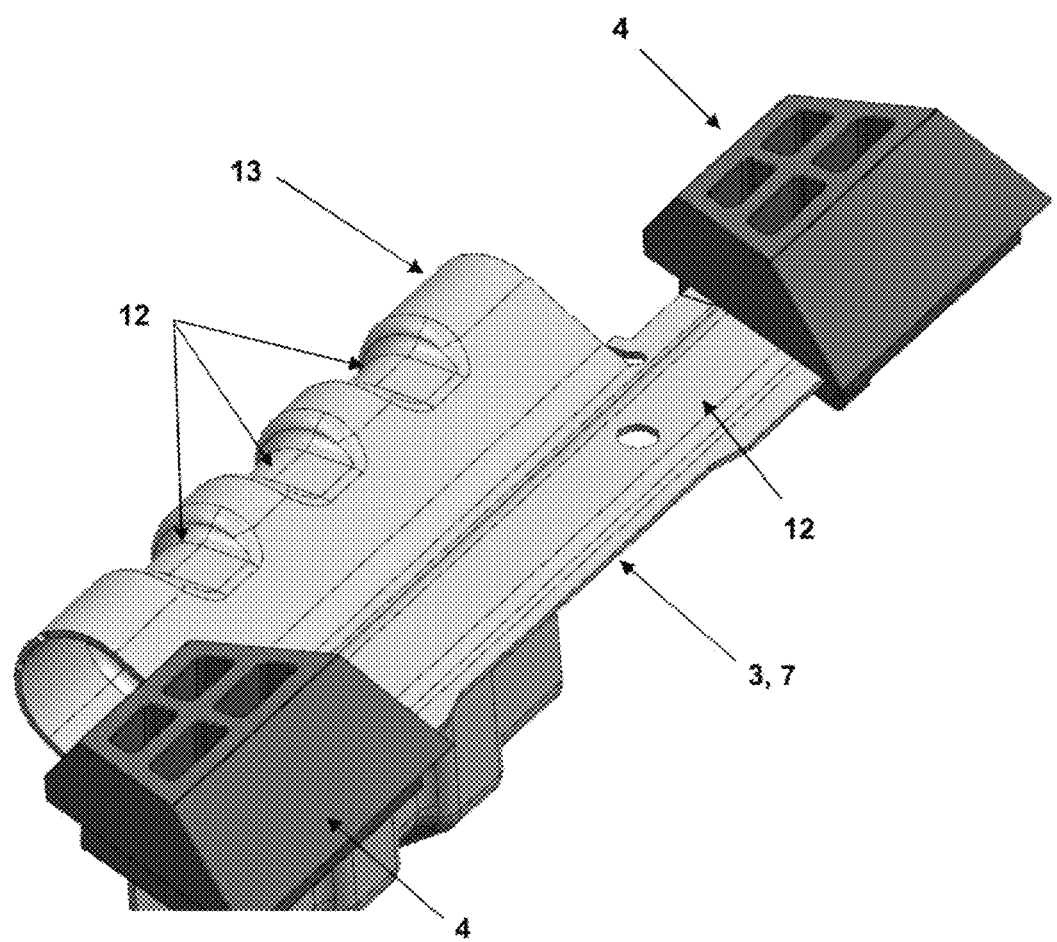
FIG. 8 shows a view of a preferred configuration of the assembly

FIG. 8 shows a preferred configuration of the assembly 10 in the state not mounted on the power tool 1. The assembly 10 which is illustrated in FIG. 8 is preassembled in the sense that the standing feet 4 are mounted on the lateral tabs 5 of the guard plate 3. However, the assembly 10 obtained in this manner is not mounted on the power tool 1, and therefore the corresponding state is referred to as "not mounted".

LIST OF REFERENCE SIGNS

1 Power tool
2 Tool
3 Guard plate
4 Standing feet
5 Tabs of the guard plate
6 Front portion of the guard plate
7 Lower portion of the guard plate
8 Slots for receiving the tabs of the guard plate
9 Mating contour for fastening the standing feet
10 Assembly
11 Housing
12 Beads
13 Circular arc surface
112 Tool hood

What is claimed is:

1. A power tool comprising:
a housing;
a disk-shaped tool; and
a guard plate to protect the power tool from flying sparks, the guard plate having supports for supporting a secure standing position of the power tool, the support including an elastic material and mountable on tabs of the guard plate;
wherein the supports are pushed laterally onto the tabs of the guard plate and are located in a mating contour formed by a circumferential raised wall of the housing.

2. The power tool as recited in claim 1 wherein the guard plate has an L shape with a front portion and a lower portion.

3. The power tool as recited in claim 2 wherein the tabs are part of the lower portion of the guard plate.

4. The power tool as recited in claim 2 wherein the lower portion of the guard plate has at least one bead for increasing the flexural rigidity of the guard plate.

5. The power tool as recited in claim 2 wherein the front portion of the guard plate has at least one bead for increasing the flexural rigidity of the guard plate.

6. The power tool as recited in claim 2 wherein the at least one bead includes three beads.

7. The power tool as recited in claim 2 wherein a transition between the front portion and the lower portion of the guard plate is configured as a circular arc surface usable as a rolling surface.

8. The power tool as recited in claim 1 wherein the supports have a trapezoidal area.

9. The power tool as recited in claim 1 wherein the supports have slots for receiving the tabs of the guard plate.

10. The power tool as recited in claim 1 wherein the supports number exactly two.

11. An assembly for rapidly mounting a guard plate and supports for supporting a secure standing position of a power tool onto a power tool, the assembly comprising:
a guard plate and supports for supporting a secure standing position of the power tool, wherein the supports including an elastic material and being mountable on tabs of the guard plate.

12. A method for rapidly mounting a guard plate and supports for supporting a secure standing position of a power tool, the method comprising:
a) providing a power tool;
b) providing an assembly including a guard plate and supports for supporting a secure standing position of the power tool, wherein the supports including an elastic material and being preassembled on tabs of the guard plate; and
c) mounting the assembly on the power tool.

13. The method as recited in claim 12 wherein the tabs extend laterally at opposite ends of the guard plate and the supports are pushed laterally onto the tabs.

14. The assembly as recited in claim 11 wherein the tabs extend laterally at opposite ends of the guard plate and the supports are located laterally on the tabs and extend laterally beyond the tabs.

\* \* \* \* \*